May 8, 1956               E. SCIME               2,744,431
GEAR OPERATED WRENCH WITH ROTARY IMPACT MEANS
Filed Dec. 16, 1954               2 Sheets-Sheet 1
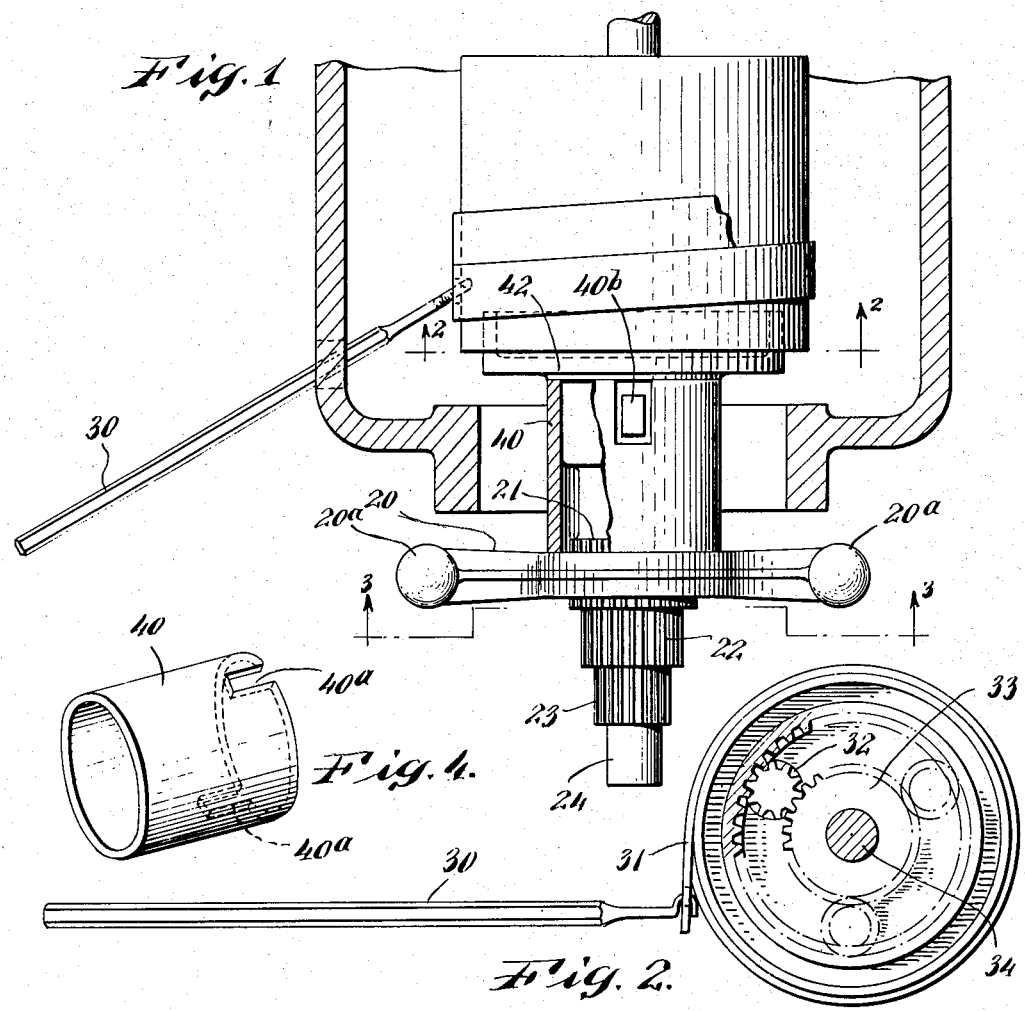
INVENTOR.
Emilio Scime May 8, 1956  E. SCIME  2,744,431
GEAR OPERATED WRENCH WITH ROTARY IMPACT MEANS
Filed Dec. 16, 1954  2 Sheets-Sheet 2
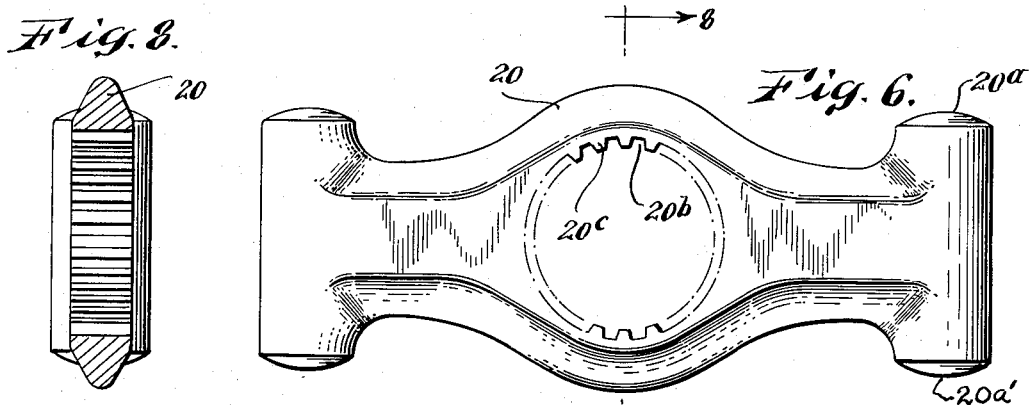
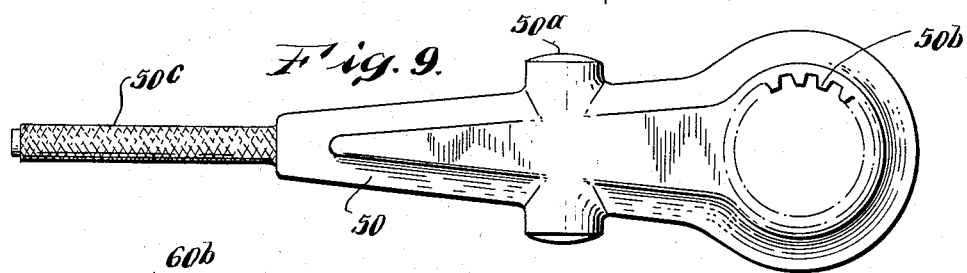
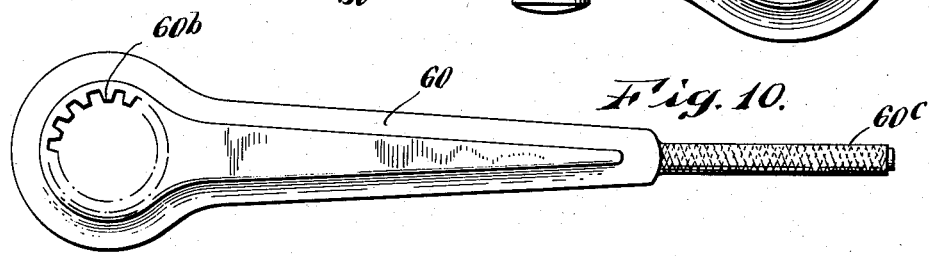
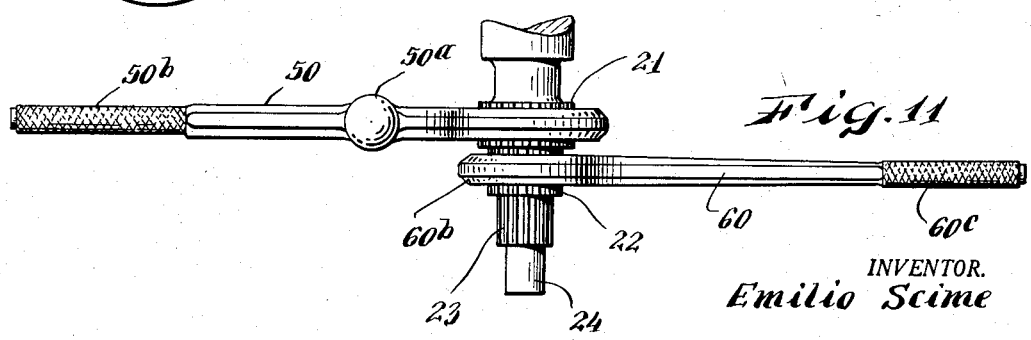
INVENTOR.
Emilio Scime _United States Patent Office_

2,744,431
Patented May 8, 1956

2,744,431

GEAR OPERATED WRENCH WITH ROTARY IMPACT MEANS

Emilio Scime, Brooklyn, N. Y.

Application December 16, 1954, Serial No. 475,761

2 Claims. (Cl. 81—52.3)

It is an object of the present invention to provide a new device for the disassemblage, disengagement and separation of transmission units of the type commonly referred to in the art as "automatic transmissions" such disassembling, disengagement and separation of the component parts thereof being accomplished by means of said device in a simple manner without requiring additional, complex equipment of any sort.

It is another and further object of the present invention to provide such a device as aforesaid, said device being of simple construction and simple in its use, employment and application, which is the only auxiliary tool, required for the purpose.

It is a still further object of the present invention, to provide such a tool as aforesaid, which in its use and application will not cause by such use any damage to such parts of the transmissions, disassembled thereby, as are during such use and employment in direct and proximate contact with said tool so that such parts are not rendered unfit for further and future use, solely by reason of the disassembling operation.

It is a further object of the present invention, to provide a device of the type herein above set forth, which can in its construction be varied and adapted to use and employment in the disassembly and disengagement of various types of mechanical units comprising planetary gears and planetary and other gear assembly arrangements such as for instance specific types of such automatic transmissions, wherein the said tool as adapted to the aforesaid specific transmissions, never the less embody the elements of the present invention and be within the scope thereof.

For the purpose of illustration and exemplification one preferred form of the present invention will be shown in the drawings and described in detail, it being understood as aforesaid that the principles of construction, design, use and employment of said tool, may be varied and adapted to specific units, for the purpose of disassembling and disengaging the same, without thereby exceeding the scope of the present invention which shall be limited only by the scope of the prior art and the appended claims.

The specific device, hereinafter set forth in detail and illustrated in the drawings is adapted for specific use in connection with the disassembly and disengagement of a specific transmission, known in the trade as the "Hydramatic" transmission produced for use in General Motors vehicles. While the device can be adapted to other like, similar and dissimilar transmissions for the sole purpose of adequate description, the use of the tool in the disassembly of the planetary gears of the said Hydramatic units is shown.

Having now reference to the drawings it will be seen that:

Fig. 1 is a top plan view showing the tool constructed in accordance with the present invention and applied to a Hydramatic automatic transmission.

Fig. 2 is a view in front elevation along the line 2—2 of Fig. 1;

Fig. 3 is a view in front elevation along the line 3—3 of Fig. 1;

Fig. 4 is a perspective view of one of the three component parts of the preferred form of the tool as shown in intimate detail and in use in Fig. 1;

Fig. 5 is a front elevational view schematically and diagrammatically illustrating the function of the tool as employed in accordance with Fig. 1;

Fig. 6 is a front facial view of another of the three components of the tool; and Fig. 7 is a top plan view of the component shown in Figs. 3 and 6; and Fig. 8 is a side elevational view in cross-section along the line 8—8 of Fig. 6.

Fig. 9 is a front elevational view showing one member of a two member unit comprising one of a variation, of the preferred form of the tool illustrated in Figs. 1 to 8 and Fig. 10 is a view, as shown in Fig. 9, of the second member of said two member unit; and Fig. 11 is a top plan view schematically and diagrammatically illustrating the use and employment of the tool, constructed in accordance with the present invention, and consisting of the two member unit comprising the members shown in Fig. 9 and Fig. 10 respectively.

In order to clearly set forth the objects of the present invention, some of which have been set forth herein above and some of which will be apparent and obvious on hand of the detailed description herein below, reference is had to the drawings illustrating one preferred form of the present invention in Figs. 1 to 8 and an alternative preferred embodiment thereof in Figs. 9–11.

In Fig. 1 the application of the tool comprising in combination the impact-sledge lever 20 the spacer 40 and the counter-hook 30 to a unit such as a Hydramatic transmission is illustrated. The impact-sledge 20 is positioned on the front unit drive gear 21 thereof engaging with the grooves 20b of the splines 20c the splines 21c of said front unit drive gear 21. This specific relationship between said impact-sledge lever 20 and said front unit drive gear 21 and the respective interengagement of the two means 20 and 21 is evident from Fig. 3 which shows the said relation in front elevation.

In order to properly position the said impact-sledge lever 20 upon said gear 21 the spacing sleeve 40 is positioned in front of said lever 20. The front unit drive gear 21 is provided with Woodruff keys 40b and the said spacing sleeve 40 is provided with the slots 40a which correspond to said keys 40b so that a properly spaced engagement between the gear 21 and the spacing sleeve 40 can be accomplished thus predetermining the horizontal position of the impact-sledge 20 upon said gear 21, along the longitudinal axis of said gear 21.

When the impact-sledge lever 20 has been positioned as aforesaid and as illustrated in Figs. 1 and 3 upon the front unit drive gear 21 so that it engages the same by interengagement between the splined means 21c of the gear 21 and the grooves 20b of the splines 20c of the sledge 20 as well as by corresponding engagement between the grooves 21b of the splines 21c with the counterparts thereof, the splines 20c of the sledge 20 a unit is formed the fixed horizontal position on the axis of the gear 21 of the sledge 20 being assured by the spacing sleeve 40 forwardly and by frictional engagement of the respective splined portions 20b, 21c and 21b, 20c of the gear 21 and the sledge 20. While this frictional engagement factor controls the relative paraaxial movement of the sledge 20 on the gear 21 in either direction, the purpose of the spacing-sleeve 40 for spacing the sledge 20 on the gear 21 is to specifically predetermine the position of the sledge 20 to avert its being too far forward, in which event the use of the sledge 20 might interfere with and conflict with other forwardly located structures.

When the impact sledge 20 has been located on the gear 21 in the manner herein above described wedged so as to form a unit by means of the linkage formed between the respective grooves and splines and spaced in a predetermined position upon the gear 21 by the spacer-sleeve 40 the disassembling and disengagement operation is initiated by applying an impact for instance by means of a hammer 70 to the anvil portion 20a of the sledge 20.

In order to cause a loosening effect, the two anvil portions 20a and 20a' must be struck selectively i. e.: first the direction of the applied force must be in one direction for instance clock-wise and the subsequent application of said force must be counterclockwise. This procedure is repeated until a sufficient loosening is effected and thereafter the force is applied only in one direction to completely disengage the loosened parts of the transmission unit from each other in a manner of "unscrewing."

The particular arrangement of the planetary gears in the unit is of such design that they form a helical gear and this arrangement permits the impact force effect, transmitted through the sledge 20 to the gear 21, to evolve into a cork-screw effect affecting the unit so that disengagement of its components is accomplished, as aforesaid in a manner of "unscrewing."

To permit adequate control of the applied force without loss, counter-hook 30 engages the unit applying a counterbalancing effect to the hammer blow upon the anvil 20a or 20a'.

As is obvious, the device, constructed in accordance with the present invention is specifically suited to disengage the planetary gears of such transmissions, when the same are locked or jammed, as under normal conditions the gears do disengage without auxiliary means.

While the use of a specific means is illustrated in Figs. 1, 2, 3, 4, 5, 6, 7 and 8 another preferred form of said means is illustrated in Figs. 9 to 11.

This variation consists of a sledge 50 and a counter-grip 60. The sledge 50 is provided with anvil portions 50a for hammer application and handle portions 50c for manual thrust. The members 50 and 60 are moved in a rocking motion forwards and backwards relative to each other to affect a disengagement of the gears, and in Fig. 11 they are shown at a point where they are moved thus to a position opposite to each other, or 180° apart.

It should be understood that either means, sledge 50 or counter-grip 60 may serve as an actuating means while the other thus functions to counter the applied force and thus an anvil portion can likewise be provided on the counter-grip handle portion 60c to serve in a manner identical to anvil portions 20a or 50a as shown.

While in the above, two preferred forms of the present invention have been set forth and described in detail, other forms embodying the principles herein set forth may be constructed without exceeding the scope of the present invention.

Having set forth and described my invention, what I desire to claim and secure in Letters Patent is:

1. A tool for disengagement of jammed, locked planetary gear trains of automatic, automotive transmissions and the like, comprising in combination, a sledge member and a counter member, said former engaging one of said gears of said gear train and said latter engaging another one of said gears, means for engagement with said gear consisting of splines provided in said sledge member and means adapted to impart and transmit impact therethrough to the gear train, said counter member counterbalancing said impact and the shock thereof said arrangement being adapted to effect unjamming and unlocking of said gear train by such impact and shock.

2. A device in accordance with claim 1, comprising in combination a sledge member and a counter member adapted for manual movement against each other wherein each of said members engages and actuates one sole component of the gear-train to effect the disengagement of the gear train unit by said movement.

References Cited in the file of this patent

UNITED STATES PATENTS

| | | |
|---|---|---|
| 2,247,521 | Pierce | July 1, 1941 |
| 2,279,118 | Fortune et al. | Apr. 7, 1942 |
| 2,342,783 | Aron et al. | Feb. 29, 1944 |
| 2,566,661 | Hamlin | Sept. 4, 1951 |
| 2,709,385 | Alger | May 31, 1955 |

FOREIGN PATENTS

| | | |
|---|---|---|
| 814,235 | France | Mar. 15, 1937 |